US009228883B2

(12) United States Patent
Nagai et al.

(10) Patent No.: US 9,228,883 B2
(45) Date of Patent: Jan. 5, 2016

(54) WEIGHING UNIT AND COMBINATION WEIGHER USING THE SAME

(75) Inventors: Takayuki Nagai, Kobe (JP); Makoto Makabe, Akashi (JP)

(73) Assignee: YAMATO SCALE CO., LTD., Akashi-shi (JP)

( * ) Notice: Subject to any disclaimer, the term of this patent is extended or adjusted under 35 U.S.C. 154(b) by 305 days.

(21) Appl. No.: 13/820,140

(22) PCT Filed: Sep. 6, 2010

(86) PCT No.: PCT/JP2010/005464
§ 371 (c)(1),
(2), (4) Date: May 13, 2013

(87) PCT Pub. No.: WO2012/032563
PCT Pub. Date: Mar. 15, 2012

(65) Prior Publication Data
US 2013/0228384 A1    Sep. 5, 2013

(51) Int. Cl.
*G01G 19/393* (2006.01)
(52) U.S. Cl.
CPC ................... *G01G 19/393* (2013.01)
(58) Field of Classification Search
CPC .......................... G01G 19/387; G01G 19/393
USPC .................................................... 177/25.18
See application file for complete search history.

(56) References Cited

U.S. PATENT DOCUMENTS

| 4,522,321 | A | * | 6/1985 | Kinoshita | ..................... 222/504 |
| 4,793,420 | A |   | 12/1988 | Hirano |  |
| 4,807,711 | A | * | 2/1989 | O'Brien et al. | ............ 177/25.18 |
| 4,852,673 | A | * | 8/1989 | Asai et al. | .................. 177/25.18 |
| 4,874,048 | A | * | 10/1989 | Kawanishi et al. | ........ 177/25.18 |
| 5,038,875 | A | * | 8/1991 | Kitagawa et al. | .......... 177/25.18 |
| 5,076,376 | A |   | 12/1991 | Bizet et al. |  |

(Continued)

FOREIGN PATENT DOCUMENTS

| DE | 37 23 136 A1 | 1/1988 |
| DE | 690 00 454 T2 | 5/1993 |

(Continued)

OTHER PUBLICATIONS

Office Action for German Patent Application No. 11 2010 005 849.0, dated Mar. 21, 2014.

(Continued)

*Primary Examiner* — Randy W Gibson
(74) *Attorney, Agent, or Firm* — Marshall, Gerstein & Borun LLP (57) ABSTRACT

A weighing unit includes a mounting fastener member including a vertical portion; a load cell disposed at the one side of the vertical portion and including an elastic body of a rectangular frame shape including a fastened portion fastened to a vertical surface and a movable portion opposite to the fastened portion. A plurality of strain gauges are bonded to the elastic body, a weighing hopper disposed at an opposite side of the load cell with respect to the vertical portion, and has a discharge gate, a coupling member is fastened at one end to the movable portion, and a hopper retaining section including receivers and protrusions, for retaining the weighing hopper, extends from the one end portion to the other end portion in a downward direction to a location below the elastic body; and a gate opening/closing mechanism attached to the coupling member.

9 Claims, 5 Drawing Sheets

(56) References Cited

U.S. PATENT DOCUMENTS

| | | | | |
|---|---|---|---|---|
| 5,324,894 | A | * | 6/1994 | Chen et al. .................. 177/25.18 |
| 5,379,923 | A | * | 1/1995 | Sagastegui et al. ........ 222/181.2 |
| 6,188,029 | B1 | * | 2/2001 | Miyamoto et al. ............ 177/105 |
| 6,365,845 | B1 | * | 4/2002 | Pearce ....................... 177/25.18 |
| 2005/0087372 | A1 | * | 4/2005 | Asai et al. .................. 177/25.18 |
| 2013/0284521 | A1 | * | 10/2013 | Nagai ........................ 177/25.18 |
| 2013/0292191 | A1 | * | 11/2013 | Nagai ............................ 177/59 |

FOREIGN PATENT DOCUMENTS

| | | | | |
|---|---|---|---|---|
| JP | 11-351953 A | 12/1999 | | |
| JP | 2000-46635 | 2/2000 | | |
| JP | 2009-244130 A | 10/2009 | | |
| WO | WO 0168493 A1 | * | 9/2001 | ........... G01G 19/393 |
| WO | WO 0188491 A1 | * | 9/2001 | ........... G01G 19/393 |
| WO | WO 2012032563 A1 | * | 3/2012 | ........... G01G 19/393 |

OTHER PUBLICATIONS

International Search Report for PCT/JP2010/005464, mailed Sep. 28, 2010.

* cited by examiner

WEIGHING UNIT AND COMBINATION WEIGHER USING THE SAME

TECHNICAL FIELD

The present invention relates to a weighing unit including a weighing hopper for weighing a weight of objects and a combination weigher using the same.

BACKGROUND ART

Conventionally, a combination weigher uses a plurality of weighing units each of which holds objects and weighs a weight of the objects held therein. Each weighing unit includes a weighing hopper which holds the objects for a specified time and discharges the objects and a load cell which supports the weighing hopper and weighs the weight of the objects inside the weighing hopper. As the load cell, for example, a Roberval-type load cell is used.

Figure 4:
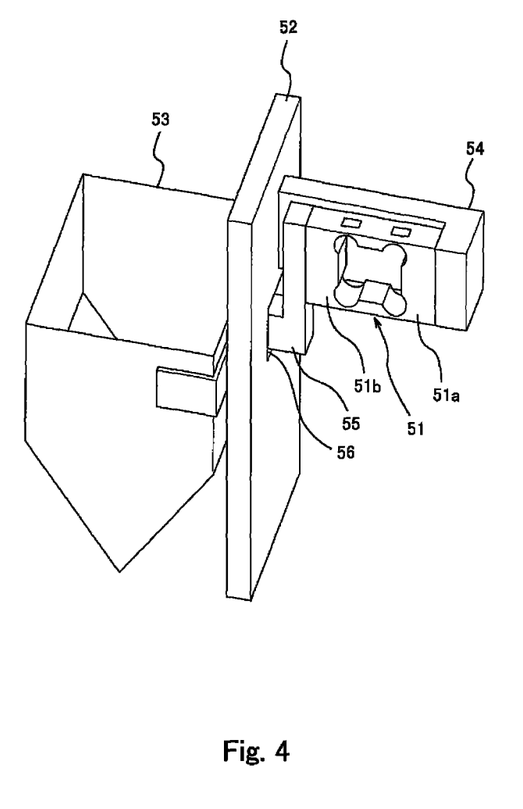
FIG. 4 is a perspective view showing a weighing unit according to a first prior art example.

FIG. 4 is a perspective view showing a weighing unit of a first prior art example which is used in the combination weigher. This weighing unit includes a weighing hopper 53 and a load cell 51 supporting the weighing hopper 53. The weighing hopper 53 and the load cell 51 are arranged at both sides of a mounting fastener member 52 so as to sandwich the mounting fastener member 52 between them. The mounting fastener member 52 corresponds to a side wall portion of a center base body 17 (see FIG. 1) of the combination weigher. The load cell 51 is disposed inside of the center base body 17. The weighing hopper 53 is disposed outside of the center base body 17. A fastened portion 51a of the load cell 51 is fastened to the mounting fastener member 52 via a L-shaped support member 54. A movable portion 51b opposite the fastened portion 51a is coupled to the weighing hopper 53 via a coupling member 55 inserted into a through-hole 56 provided in the mounting fastener member 52.

In the weighing unit of the first prior art example, a stiffness of the L-shaped support member 54 must be increased to suppress reduction in weighing accuracy, and a size of the support member 51 must be increased. Accordingly, the present inventors proposed a weighing unit disclosed in Patent Literature 1 to suppress reduction in weighing accuracy, provide a compact configuration, etc. This weighing unit will be described as a second prior art example.

Figure 5:
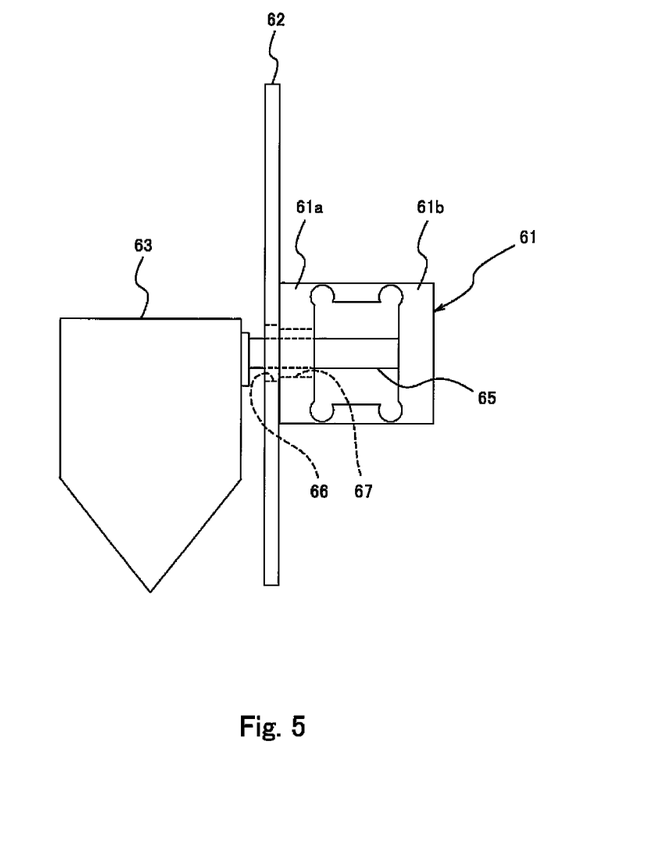
FIG. 5 is a side view showing a weighing unit according to a second prior art example.

FIG. 5 is a side view showing a weighing unit of a second prior art example. In this weighing unit, also, a weighing hopper 63 and a load cell 61 are arranged at both sides of a mounting fastener member 62 so as to sandwich the mounting fastener member 62 between them. The mounting fastener member 62 corresponds to the side wall portion of the base body 17 (see FIG. 1) of the combination weigher. The load cell 61 is disposed inside of the center base body 17. The weighing hopper 63 is disposed outside the center base body 17. In this weighing unit, a fastened portion 61a of the load cell 61 is directly fastened to the mounting fastener member 62. One end of a coupling member 65 is fastened to an inner peripheral surface of a movable portion 61b of the load cell 61, while the other end thereof is coupled to the weighing hopper 63. The coupling member 65 is inserted into a through-hole 67 provided in the fastened portion 61a and a through-hole 66 provided in the mounting fastener member 62 and coupled to the weighing hopper 63.

CITATION LISTS

Patent Literature

Patent Literature 1: Japanese Laid-Open Patent Application Publication No. 2009-244130

SUMMARY OF THE INVENTION

Technical Problem

A weighing hopper used in a combination weigher includes a discharge gate. The discharge gate is opened and closed to discharge weighed objects. However, in the first prior art example and the second prior art example, the discharge gate and a gate opening/closing mechanism for opening and closing the discharge gate are not explicitly recited.

Typically, the load cell for supporting the weighing hopper is configured to support the gate opening/closing mechanism in addition to the weighing hopper. In the case of the first prior art example, for example, the coupling member 55 is extended to a great length toward the weighing hopper 53 through the through-hole 56, and the extended portion supports the gate opening/closing mechanism to thereby support the weighing hopper 53 and the gate opening/closing mechanism by the load cell 51. In the case of the second prior art example, to support the gate opening/closing mechanism by the coupling member 65, for example, the coupling member 65 is also extended to a great length toward the weighing hopper 63 through the through-hole 66, and the extended portion supports the gate opening/closing mechanism to thereby support the weighing hopper 63 and the gate opening/closing mechanism by the load cell 61. In both cases, the coupling members 55 and 65 are extended to a great degree and the weighing hoppers 53 and 63 are attached to tip end portions of the extended portions, respectively. Therefore, the weighing hoppers 53 and 63 are distant from the load cells 51 and 61, respectively. A weighing section from the load cell to the weighing hopper may be assumed as a cantilever. As the weighing hoppers 53 and 63 are distant from the load cells 51 and 61, respectively, natural (character) frequencies of the weighing sections decrease and responsiveness thereof becomes low.

The combination weigher is often used to weigh food such as snacks. To meet sanitation requirement, outer surfaces (surfaces at which the weighing hoppers are disposed) of the mounting fastener members 52 and 66 corresponding to the center base body 17 (see FIG. 1) of the combination weigher must be washed. Inside of the center base body 17, electric components or the like which are weak to water, including the load cell are accommodated. Because of this, typically, it is necessary to form a structure for preventing washing water from flowing into the inside of the center base body 17. To this end, in the case of the first prior art example, for example, a bellows may be attached to the through-hole 56 into which the coupling member 55 is inserted to prevent water from flowing from outside into inside (side at which the load cell is disposed) of the mounting fastener member 52. In the case of the second prior art example, for example, a bellows may also be attached to the through-hole 66 into which the coupling member 65 is inserted.

In the case of the second prior art example, the load cell 61 is fastened in contact with the inner surface of the mounting fastener member 62. Because of this, the bellows cannot be extended inward from the through-hole 66 to be attached thereto, but is required to be extended from the through-hole 66 toward the weighing hopper 63 (outward). To enable the bellow to perform its function, the bellows is required to have a certain length. If the bellows is extended from the through-hole 66 toward the weighing hopper 63 to be attached thereto, it is necessary to increase a space between the mounting fastener member 62 and the weighing hopper 63. In addition, the weighing hopper 63 is more distant from the load cell 61. This further makes responsiveness lower. By comparison, in the case of the first prior art example, the coupling member 55 and a space exist between the load cell 51 and the mounting fastener member 52. Because of this, a distance from the load cell 51 to a center of gravity of the weighing hopper 53 is long, and therefore responsiveness is low.

Although the present inventors proposed the second prior art example for providing the compact configuration as a solution to the first prior art example. As described above, in both cases, responsiveness becomes low due to provision of the gate opening/closing mechanism. In the case of the second prior art example, when the bellows is attached to the through-hole 66 to provide a water-proof structure at the load cell side, responsiveness becomes lower. In the case of the first prior art example, the coupling member 55 and the space exist between the load cell 51 and the mounting fastener member 52, which makes responsiveness lower.

The present invention has been developed to solve the above described problem, and an object of the present invention is to provide a weighing unit which can realize a compact configuration and improve responsiveness, and a combination weigher using the same.

Solution to Problem

To achieve the above mentioned object, a weighing unit comprises a mounting fastener member including a vertical portion having a vertical surface at one side; a load cell disposed at the one side of the vertical portion and including an elastic body of a rectangular frame shape and a plurality of strain gauges bonded to the elastic body, the elastic body including a fastened portion fastened to the vertical surface and a movable portion opposite to the fastened portion in a direction perpendicular to the vertical surface, the load cell being configured to output an electric signal corresponding to a magnitude of a load applied to the movable portion; a weighing hopper which is disposed at an opposite side of the load cell with respect to the vertical portion, and has a discharge gate which holds the objects fed to the weighing hopper and discharges the held objects; a coupling member which is fastened at one end portion to the movable portion, is provided at the other end portion with a hopper retaining section for retaining the weighing hopper, extends from the one end portion to the other end portion in a downward direction to a location below the elastic body, and is inserted into a through-hole provided in the mounting fastener member; and a gate opening/closing mechanism attached to the coupling member, for opening/closing the discharge gate.

In accordance with this configuration, since the load cell is directly fastened to the mounting fastener member, the L-shaped support member 54 shown in FIG. 4 in the first prior art becomes unnecessary and a compact configuration can be achieved. Since the gate opening/closing mechanism is attached to the coupling member extending downward to the location below the elastic body, the weighing hopper can be made closer to the load cell without protruding the gate opening/closing mechanism toward the weighing hopper to a greater degree than the vertical portion fastened with the load cell. That is, since a horizontal center of gravity of the weighing hopper can be made closer to the load cell, a natural (character) frequency of a weighing section can be made higher, and responsiveness can be improved.

The weighing unit may further comprise a sealing member for sealing a space in the through-hole between the coupling member and the mounting fastener member. This makes it possible to prevent water or the like from entering from outside (weighing hopper side) of the mounting fastener member to inside (load cell side) of the mounting fastener member.

The mounting fastener member may include a horizontal portion extending from a lower end of the vertical portion toward the one side; and the coupling member may have a portion extending downward from the one end portion fastened to the movable portion, and the through-hole may be provided in the horizontal portion to insert the portion extending downward into the through-hole.

In accordance with this configuration, since the mounting fastener member has the horizontal portion extending to one side and the through-hole is provided in the horizontal portion to insert the portion extending downward from the one end portion of the coupling member which is fastened to the movable portion into the through-hole, the weighing hopper can be easily made closer to the load cell without protruding the gate opening/closing mechanism toward the weighing hopper to a greater degree than the vertical portion fastened with the load cell. That is, responsiveness can be improved easily. Since the through-hole of the horizontal portion vertically penetrates the horizontal portion and the coupling member is displaced in the same direction in which the through-hole penetrates when the objects are fed to the weighing hopper, for example, a diaphragm can be used as a sealing member.

The coupling member may be disposed within a region at the one side such that the coupling member does not protrude to a greater degree toward the other side (opposite side) than a location immediately below the vertical portion. This makes it easy to configure the gate opening/closing mechanism attached to the coupling member such that it does not protrude toward the weighing hopper to a greater degree than the vertical portion.

A combination weigher of the present invention comprises a plurality of weighing units of the present invention; a weight calculating means for calculating a weight of the objects held in the weighing hopper based on the electric signal output from the load cell in each of the weighing units; and a combination means which performs combination calculation based on weights of the objects calculated by the weight calculating means to find a combination in which a total of weights of the objects falls within an allowable range with respect to a target weight.

Since the combination weigher is configured to include the plurality of weighing units of the present invention, a compact configuration of the combination weigher can be achieved. Since the weighing unit of the present invention has high responsiveness, a weighing speed of the combination weigher can be improved.

Advantageous Effects of the Invention

The present invention has the above described configuration and has an advantage that it is possible to provide a weighing unit capable of providing a compact configuration and improving responsiveness, and a combination weigher using the same.

The above and further objects, features and advantages of the present invention will more fully be apparent from the following detailed description of preferred embodiments with accompanying drawings.

DESCRIPTION OF THE INVENTION

Hereinafter, preferred embodiment of the present invention will be described with reference to the drawings. Throughout the drawings, the same or corresponding components are designated by the same reference symbols and will not be described in repetition. Note that the present invention is not limited to the embodiments described below.

Embodiment

Figure 1:
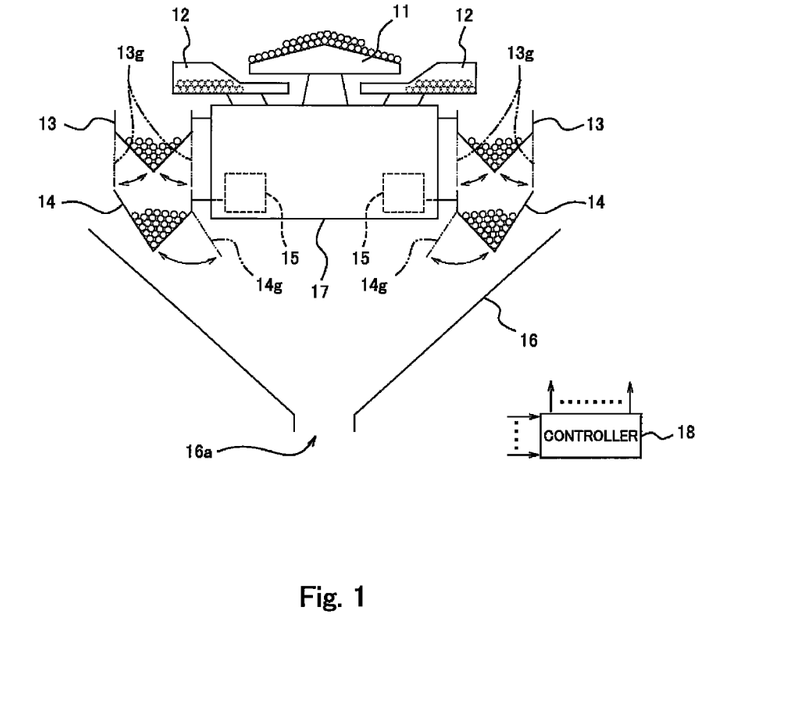
FIG. 1 is a schematic view showing an exemplary schematic configuration of a combination weigher using a weighing unit according to an embodiment of the present invention.

FIG. 1 is a schematic view showing an exemplary schematic configuration of a combination weigher using a weighing unit according to an embodiment of the present invention.

The combination weigher includes a conical dispersion feeder 11 at a center of an upper portion of the combination weigher to radially disperse objects supplied from an outside supply device (not shown) by vibration. Around the dispersion feeder 11, linear feeders 12 are disposed to feed the objects sent from the dispersion feeder 11 to the feeding hopper 13 by vibration, respectively. Below the linear feeders 12, the plurality of feeding hoppers 13, a plurality of weighing hoppers 14 and a plurality of memory hoppers 15 are disposed to correspond to the linear feeders 12, respectively, and are arranged in a circular form. Each of the feeding hopers 13 has a discharge gate 13g which holds the objects sent from the linear feeder 12 to the feeding hopper 13 for a specified time and then discharges the objects to the weighing hopper 14 located therebelow.

Each of the weighing hoppers 14 has a discharge gate 15g which holds the objects fed from the feeding hopper 13 located thereabove for a specified time and discharges the objects to a collecting chute 16. Each of the weighing hoppers 14 is coupled to a load cell 15 which is a load detector (sensor). A load signal (electric signal) output from each of load cells 15 is input to a controller 18.

Below the weighing hoppers 14 arranged in the circular form, the collecting chute 16 having a substantially inverted-truncated-cone shape is disposed. The objects discharged from the weighing hoppers 14 selected to make up a discharge combination (described later) slide down along the chute 16 and are discharged to, for example, a packaging machine (not shown) through a discharge outlet 16a at a bottom portion thereof.

The controller 18 is constituted by a CPU, and a microcontroller including memories such as a ROM and a RAM which contain operation programs and operation parameters of the CPU, etc. The CPU executes the operation programs stored in the ROM to control an operation of the overall combination weigher, etc. Specifically, the controller 18 controls vibration amplitudes of the dispersion feeder 11 and of the linear feeders 12 and operation times thereof. In addition, the controller 18 controls an actuator for opening and closing the discharge gate 13g of the feeding hopper 13 and the discharge gate 14g of the weighing hopper 14.

The controller 18 serves as a weight calculating means which receives as inputs load signals output from the load cells 15 attached with the weighing hoppers 14 and calculates weights of the objects held in the weighing hoppers 14 based on the load signals. In addition, the controller 18 serves as a combination means which performs a combination process. In the combination process, the controller 18 performs combination calculation based on the calculated weights of the objects to find a combination in which a total weight of the objects falls within a predetermined weight range (allowable range with respect to a target weight). In a case where there exist plural combinations whose total weights fall within the predetermine weight ranges, the controller 18 finds a combination in which an absolute value of a difference between the total weight of the objects and the target weight is smallest. The controller 18 determines that the combination of the weighing hoppers 14 holding the objects corresponding the combination found in this way is a discharge combination.

Then, the controller 18 opens and closes a predetermined timing the discharge gates 14g of the weighing hoppers 14 selected to make up the discharge combination to discharge the objects from the weighing hoppers 14. When the weighing hoppers 14 discharge the objects and become empty, the controller 18 causes the feeding hopers 13 located thereabove to feed the objects to the empty weighing hoppers 14. To the empty feeding hoppers 13, the controller 18 causes the linear feeders 12 located thereabove to the feed the objects.

The controller 18 need not be constituted by a single controller but may be plurality of controllers which are distributed and cooperate with each other to control the operation of the combination weigher.

In the combination weigher, a center base body 17 is disposed at a center portion thereof and supported by, for example, four legs (not shown). The center base body 17 has an outer shape of a substantially cylindrical shape or square column shape. The dispersion feeder 11 and the linear feeders 12 are disposed on an upper surface of the center base body 17. The feeding hoppers 13 and the weighing hoppers 14 are disposed to surround a side surface of the center base body 17. The feeding hoppers 13 are supported on the center base body 17, while the weighing hoppers 14 are supported on the center base body 17 via the load cells 15. Inside of the center base body 17, driving devices (not shown) of the discharge gates of the feeding hoppers 13 and the discharge gates of the weighing hoppers 14, etc., are arranged.

Figure 2A:
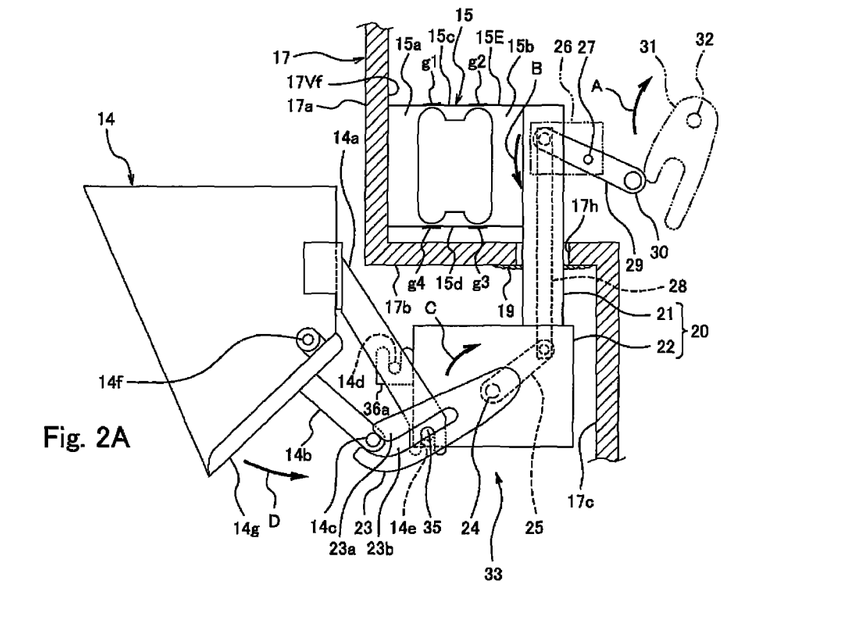
FIG. 2A is a side view showing a schematic configuration of the weighing unit according to the embodiment of the present invention.
Figure 2B:
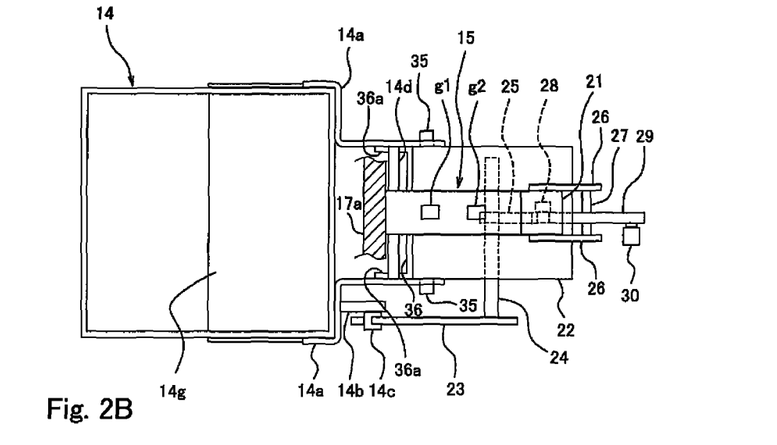
FIG. 2B is a plan view of the weighing unit.

A weighing unit of the present embodiment includes the weighing unit 14 and the load cell 15. FIG. 2A is a side view showing a schematic configuration of the weighing unit according to the embodiment, and FIG. 2B is a plan view of the weighing unit.

The center base body 17 attached with the load cell 15 has a side wall (mounting fastener member) including a vertical portion 17a at an upper portion thereof, a horizontal portion 17b provided with a through-hole 17h, and a vertical portion 17c at a lower portion. The load cell 15 is fastened to an inner vertical surface 17Vf of the vertical portion 17a. The side wall of the center base body 17 does not substantially vibrate, and its absolute position is invariable. Note that the vertical portion 17c at the lower portion may be omitted. In this case, the horizontal portion 17b may be formed by a bottom surface of the center base body 17. The horizontal portion 17b is preferably oriented horizontally, but may be slightly inclined. In a case where the horizontal portion 17b is slightly inclined, the through-hole 17h is preferably provided to vertically penetrate the horizontal portion 17b as well. The horizontal portion 17b and the vertical portion 17c are not shown in FIG. 2B.

The weighing unit includes the weighing hopper 14, the load cell 15 of Roberval type, the vertical portions 17a and 17c and the horizontal portion 17b constituting the side wall of the center base body 17, a coupling member 20 (first coupling section 21 and second coupling section 22), and a gate opening/closing mechanism 33 mounted to the coupling member 20.

The load cell 15 is configured such that a plurality of strain gauges g1~g4 are bonded to an elastic body 15E of a rectangular frame shape. In the elastic body 15E, a fastened portion 15a and a movable portion 15b which are horizontally opposite to each other are coupled together by means of a pair of beam portions 15c and 15d which are vertically opposite to each other. Four thinned wall portions are formed in the pair of beam portions 15c and 15d such that the thinned wall portions at an upper side and the thinned wall portions at a lower side are symmetric. The strain gauges g1~g4 are bonded to the thinned wall portions, respectively.

The load cell 15 is fastened to the vertical portion 17a by, for example, screwing in such a manner that the fastened portion 15a is in contact with the vertical surface 17Vf of the vertical portion 17a. The coupling member 20 is fastened to the movable portion 15 which is an unfastened portion by, for example, screwing. The coupling member 20 includes the first coupling section 21 fastened to the movable portion 15 and extending downward (vertically downward) and the second coupling section 22 joined to a lower end of the first coupling section 21. The first coupling section 21 extends downward through the through-hole 17h provided in the horizontal portion 17b. A diaphragm 19 is attached to the through-hole 17h and a region in the vicinity thereof as a sealing member for closing a space in the through-hole 17h between the first coupling section 21 and the horizontal portion 17b.

The second coupling section 22 is attached with a hopper retaining member 36 having two receivers 36a on an outer surface at the weighing hopper 14 side to retain the weighing hopper 14. The second coupling section 22 is provided with protrusions 35 on both side surfaces, respectively. The two receivers 36a and the two protrusions 35 constitute a hopper retaining section.

In the weighing hopper 14, a pair of mounting members 14a are fastened to a body thereof, and fitting portions 14e fitted to the protrusions 35 are provided at lower ends of the pair of mounting members 14a, respectively. A coupling rod 14d is fastened to intermediate portions of the pair of mounting members 14a, respectively, to couple the pair of mounting members 14a to each other. The coupling rod 14 is fitted to the two receivers 36a of the hopper retaining member 36, and the fitting portions 14e are fitted to the protrusions 35, respectively, thereby retaining the weighing hopper 14 in a predetermined position.

The weighing hopper 14 has a discharge gate 14g supported such that the discharge gate 14g is rotatable around a shaft 14f. An actuation plate 14b protrudes from an outer surface of the discharge gate 14g. A cam follower 14c is attached to a tip end portion of the actuation plate 14b. When an arm member 23 rotates in a direction of an arrow C around a horizontal shaft 24, the discharge gate 14g rotates in a direction of an arrow D around the shaft 14f (discharge gate 14g opens).

The arm member 23 is fastened to a horizontal shaft 24 rotatably supported. One end of a link member 25 is fastened to the shaft 24 inside of the second coupling section 21. The other end of the link member 25 is attached to a lower end portion of an up-down rod 28 such that the link member 25 is rotatable around the other end. One end of the link member 29 is attached to an upper end portion of the up-down rod 28 such that the link member 29 is rotatable around the one end. A cam follower 30 is attached to the other end of the link member 29. The link member 29 is rotatably attached to a horizontal shaft 27 penetrating a center portion thereof. The horizontal shaft 27 is fastened to the first coupling section 21 via a pair of mounting members 26. The first coupling section 21 has a hollow portion inside thereof in which the up-down rod 28 is disposed such that the up-down rod 28 is movable up and down. The first coupling section 21 is provided on a side surface thereof with a vertical groove along which the link member 29 is movable (rotatable).

The components of the gate opening/closing mechanism 33 attached to the coupling member 20 are the arm member 23, the link members 25 and 29, the horizontal shafts 24 and 27, the mounting member 26, the up-down rod 28 and the cam follower 30, among the components shown in FIG. 2A. The components which are not shown in FIG. 2A include a member for supporting the horizontal shaft 24 such that the horizontal shaft 24 is horizontal and rotatable, etc.

To actuate the gate opening/closing mechanism 33, an arm member 31 in contact with the cam follower 30 is fastened to a shaft 32 which is configured to be rotated by an actuator (e.g., motor) which is not shown.

As shown in FIG. 2A, in a state in which the discharge gate 14g is closed, a stopper portion 23a of the arm member 23 is in contact with the cam follower 14c. In this state, the discharge gate 14g is inhibited from being opened and maintained in a closed state, even when the objects are fed to inside of the weighing hopper 14 and the weight of the objects applies a force to open the discharge gate 14g. At this time, the arm member 31 and the cam follower 30 are apart from each other. Thus, a load exerted by the arm member 31 is not applied to the movable portion 15b of the load cell 15. Based on a load signal of the load cell 15 in this state, the weight of the objects held inside of the weighing hopper 14 is calculated.

To open the discharge gate 14g, the actuator rotates an arm member 31 around the shaft 32 in a direction of arrow A. According to the rotation of the arm member 31 in the direction of arrow A, the link member 29 is rotated in a direction of arrow B around the horizontal shaft 27 and the up-down rod 28 moves downward. According to the downward movement of the up-down rod 28, the arm member 23 is rotated in the direction of arrow C around the horizontal shaft 24, together with the link member 25. Thereby, the cam follower 14c moves along a guide passage 23b formed by the arm member 23, and the discharge gate 14g is rotated in the direction of arrow D around the shaft 14f. Thus, the discharge gate 14g is opened.

To close the discharge gate 14g, the actuator rotates the arm member 31 around the shaft 32 in a direction opposite to the direction of arrow A to cause the arm member 31 to return to a state shown in FIG. 2A. Thus, an operation which is a reverse of the above stated operation is performed, and the discharge gate 14g is closed.

As well known, the load cell 15 includes a Wheatstone bridge circuit including a plurality of strain gauges g1~g4, an amplifier section for amplifying an output voltage of the Wheatstone bridge circuit, and an A/D converter section for performing A/D conversion of an output of the amplifier section. A schematic configuration of the Wheatstone bridge circuit is, for example, such that four strain gauges g1, g2, g3, and g4 are connected together via wires such that the strain gauges g1, g2, g3, and g4 are arranged in an annular shape in this order, and a DC voltage (V) is applied between a contact point of the two strain gauges g2 and g3 and a contact point of the two strain gauges g4 and g1. A voltage between a contact point of the two strain gauges g1 and g2 and a contact point of the two strain gauges g3 and g4 is taken out as an output voltage. The amplifier section amplifies the output voltage and the A/D converter section convers the amplified voltage into a digital load signal (Sw) and outputs the digital load signal (Sw) to the controller 18. The amplifier section and the A/D converter section are constituted by circuit boards (not shown), respectively. The circuit boards are bonded to, for example, the fastened portion 15a. The DC voltage V is supplied from, for example, the controller 18.

The controller 18 calculates the weight of the objects inside of the weighing hopper 14 based on a load indicated by the load signal (Sw). For example, the controller 18 calculates the weight of the objects in such a manner that a load (zero load) of the weighing hopper 14 corresponding to an empty state in which the weighing hopper 14 does not hold the objects is detected and stored, a load derived by subtracting the zero load from a load detected when the objects are fed to the weighing hoper 14 is calculated, and a weight corresponding the calculated load is found as the weight of the objects. The controller 18 serves as a weight calculating means for calculating the weight of the objects based on the load signal Sw which is an output signal (electric signal) of the load cell 15.

In the weighing unit of the present embodiment, the load cell 15 is directly fastened to the side wall (vertical portion 17a) of the center base body 17. This eliminates a need for the L-shaped support member 54 shown in FIG. 4 in the first prior art example. Thus, a compact configuration of the weighing unit is achieved.

The gate opening/closing mechanism 33 is attached to the coupling member 20 having a configuration in which the first coupling section 21 fastened at one end portion thereof to the movable portion 15b extends downward and its lower end is joined to the second coupling section 22. Therefore, the weighing hopper 14 can be made closer to the load cell 15 easily without protruding the gate opening/closing mechanism 33 outward (leftward in FIG. 2A) to a greater degree than the vertical portion 17a fastened with the load cell 15. That is, since a horizontal center of gravity of the weighing hopper 14 can be made closer to the load cell 15, a natural (character) frequency of a weighing section can be made higher, and responsiveness thereof can be improved. By providing the coupling member 20 within a region inward (rightward in FIG. 2A) relative to a location immediately below the vertical portion 17a fastened with the load cell 15, the gate opening/closing mechanism 33 can be easily configured not to protrude outward to a greater degree than the vertical portion 17a fastened with the load cell 15.

In the present embodiment, the horizontal portion 17b is provided with the through-hole 17h vertically penetrating therethrough, and the first coupling section 21 extending vertically downward from one end portion fastened to the movable portion 15b is inserted into the through-hole 17h. Since the first coupling section 21 is displaced in the same direction in which the through-hole 17h penetrates when the feeding hopper 13 feeds the objects to the weighing hopper 14, the diaphragm 19 can be used as a sealing member for providing a water-proof structure in the interior of the center base body 17. Even when the diaphragm 19 is attached to the through-hole 17h and a region in the vicinity thereof, it is not necessary to position the weighing hopper 14 distant from the load cell 15. Therefore, responsiveness is not negatively affected.

The retaining structure for retaining the weighing hopper 14 and the gate opening/closing mechanism 33 of the discharge gate 14g as described above are merely exemplary. They are not limited to the above but may be changed various ways.

Figure 3:
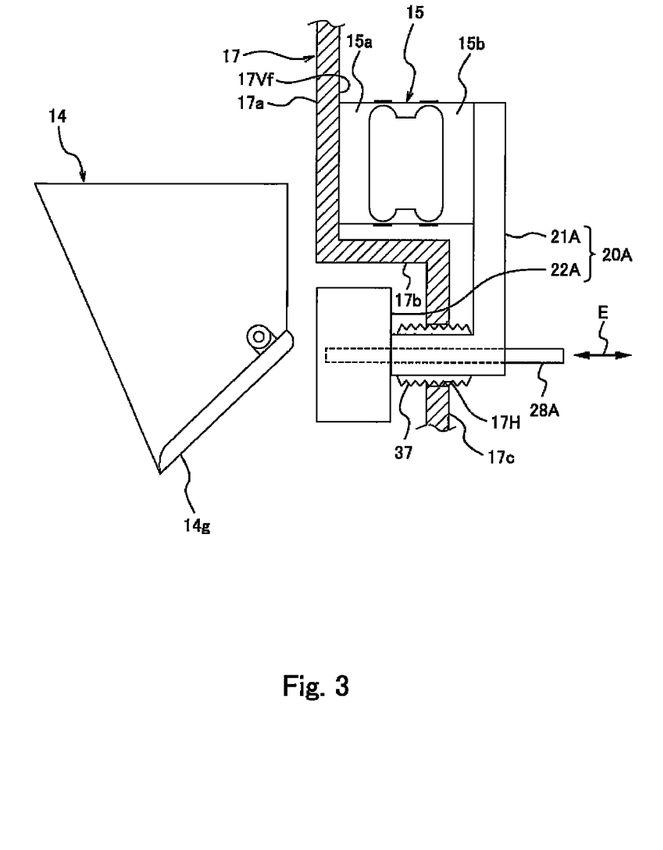
FIG. 3 is a side view showing a schematic configuration of a weighing unit according to a modified example of the embodiment of the present invention

FIG. 3 is a side view showing a schematic configuration of a weighing unit according to a modified example of the present embodiment. In FIG. 3, a first coupling section 21A fastened to the movable portion 15b extends downward, then extends horizontally from its lower end and is coupled to a second coupling section 22A. The weighing hopper 14 is retained by the second coupling section 22A. The retaining structure can be changed variously as described above and is not shown in FIG. 3. In addition, the gate opening/closing mechanism 33 of the discharge gate 14g can be changed variously as described above and is not shown in FIG. 3. For example, as indicated by arrow E, a horizontal rod 28A may be extended and retracted horizontally, thereby opening and closing the discharge gate 14g. Or, the horizontal rod 28A may be rotated around its center axis, thereby opening and closing the discharge gate 14g. Or, another configuration may be used.

In the present modified example, the coupling member 20A includes the L-shaped first coupling section 21A and the second coupling section 22A. A horizontally extending portion of the first coupling section 21A is inserted into a through-hole 17H provided in the vertical portion 17c, and a bellows 37 is attached to the through-hole 17H to close a space in the through-hole 17H between the first coupling section 21A and the vertical portion 17c. In this configuration, the horizontal center of gravity of the weighing hopper 14 can be made closer to the load cell 15, and responsiveness thereof can be improved, as compared to a case where a gate opening/closing mechanism is provided, and a water-proof structure is provided at the load cell side in the configuration of FIG. 4 or FIG. 5. In the present modified example, the coupling member 20A is preferably provided within a region inward (right side in FIG. 3) relative to a location immediately below the vertical portion 17a fastened with the load cell 15. Thus, the horizontal center of gravity of the weighing hopper 14 can be made closer to the load cell 15 such that the gate opening/closing mechanism 33 does not protrude outward to a greater degree than the vertical portion 17a.

Although in the present modified example, the first coupling section 21A is fastened to one side surface of the movable portion 15b, it may be fastened to another portion of the movable portion 15b. For example, the first coupling section 21A may be fastened to another side surface of the movable portion 15b which is different from that shown in the example of FIG. 3, or may be fastened to a lower end surface (bottom surface) of the movable portion 15b. Or, in the configuration in which the first coupling section 21 is inserted into the through-hole 17h provided in the horizontal portion 17b as shown in FIG. 2A, for example, a structure of the gate opening/closing mechanism 33 may be changed such that the first coupling section 21 is fastened to another portion of the movable portion 15b.

Although in FIGS. 2A, 2B, and FIG. 3, the discharge gate 14g of the weighing hopper 14 has one gate, there may be provided with, for example, a discharge gate having a double-door structure in which a pair of gates are opened and closed at the same time. That is, the structure of the weighing hopper 14 is not limited to the structure shown in FIG. 2A, 2B and FIG. 3.

By using the weighing unit of the present embodiment in, for example, the combination weigher of FIG. 1, the combination weigher can be made compact. The weighing unit of the present embodiment has high responsiveness, and therefore is capable of improving a weighing speed of the combination weigher.

The combination weigher using the weighing unit of the present embodiment is not limited to the combination weigher shown in FIG. 1. For example, in the configuration shown in FIG. 1, a hopper (memory hopper) for holding the objects discharged from the weighing hopper 14 and discharging the objects is provided obliquely below each of the weighing hoppers 14, and the weighing hopper 14 may be configured to selectively discharge the objects either to the memory hopper or to the collecting chute 16. In this case, the weighing hopper 14 has two discharge gates. When one of the discharge gates is opened, the objects are discharged to the memory hopper, while when the other of the discharge gates is opened, the objects are discharged to the collecting chute 16. In this case, a discharge combination is selected from among the weighing hoppers 14 and the memory hoppers.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is useful as a weighing unit capable of providing a compact configuration and improving responsiveness, a combination weigher using the same, etc.

REFERENCE SIGNS LISTS 14 weighing hopper
14g discharge gate
14 load cell
15a fastened portion
15b movable portion
15c, 15d beam portion
15E elastic body
g1~g4 strain gauge
17 center base body
17a vertical portion
17b horizontal portion
17c vertical portion
17Vf vertical surface
18 controller
20, 20A coupling member
33 gate opening/closing mechanism

The invention claimed is:

1. A weighing unit comprising:
a mounting fastener member including a vertical portion having a vertical surface at one side;
a load cell disposed at the one side of the vertical portion and including an elastic body of a rectangular frame shape and a plurality of strain gauges bonded to the elastic body, the elastic body including a fastened portion fastened to the vertical surface and a movable portion opposite to the fastened portion in a direction perpendicular to the vertical surface, the load cell being configured to output an electric signal corresponding to a magnitude of a load applied to the movable portion;
a weighing hopper which is disposed at an opposite side of the load cell with respect to the vertical portion, and has a discharge gate which holds the objects fed to the weighing hopper and discharges the held objects;
a coupling member which is fastened at one end portion to the movable portion, is provided at the other end portion with a hopper retaining section for retaining the weighing hopper, extends from the one end portion to the other end portion in a downward direction to a location below the elastic body, and is inserted into a through-hole provided in the mounting fastener member; and
a gate opening/closing mechanism attached to the coupling member, for opening/closing the discharge gate,
wherein the mounting fastener member to which the fastened portion of the load cell is fastened is a portion of a side wall defining a center base body, the weighing hopper being one of a plurality of weighing hoppers disposed to surround the center base body, and wherein the load cell is disposed inside of the center base body.

2. The weighing unit according to claim 1, further comprising:
a sealing member for sealing a space in the through-hole between the coupling member and the mounting fastener member.

3. The weighing unit according to claim 1,
wherein the mounting fastener member includes a horizontal portion extending from a lower end of the vertical portion toward the one side; and
wherein the coupling member has a portion extending downward from the one end portion fastened to the movable portion, and the through-hole is provided in the horizontal portion to insert the portion extending downward into the through-hole.

4. The weighing unit according to claim 3,
wherein the coupling member is disposed within a region at the one side such that the coupling member does not protrude toward the other side to a greater degree than a location immediately below the vertical portion.

5. A combination weigher comprising:
a plurality of weighing units each of which is recited in claim 1;
a weight calculating means for calculating a weight of the objects held in the weighing hopper based on the electric signal output from the load cell in each of the weighing units; and
a combination means which performs combination calculation based on weights of the objects calculated by the weight calculating means to find a combination in which a total of weights of the objects falls within an allowable range with respect to a target weight.

6. The weighing unit according to claim 2,
wherein the mounting fastener member includes a horizontal portion extending from a lower end of the vertical portion toward the one side; and
wherein the coupling member has a portion extending downward from the one end portion fastened to the movable portion, and the through-hole is provided in the horizontal portion to insert the portion extending downward into the through-hole.

7. A combination weigher comprising:
a plurality of weighing units each according to claim 2;
a weight calculating means for calculating a weight of the objects held in the weighing hopper based on the electric signal output from the load cell in each of the weighing units; and
a combination means which performs combination calculation based on weights of the objects calculated by the weight calculating means to find a combination in which a total of weights of the objects falls within an allowable range with respect to a target weight.

8. A combination weigher comprising:

a plurality of weighing units each according to claim 3;

a weight calculating means for calculating a weight of the objects held in the weighing hopper based on the electric signal output from the load cell in each of the weighing units; and a combination means which performs combination calculation based on weights of the objects calculated by the weight calculating means to find a combination in which a total of weights of the objects falls within an allowable range with respect to a target weight.

9. A combination weigher comprising:

a plurality of weighing units each according to claim 4;

a weight calculating means for calculating a weight of the objects held in the weighing hopper based on the electric signal output from the load cell in each of the weighing units; and a combination means which performs combination calculation based on weights of the objects calculated by the weight calculating means to find a combination in which a total of weights of the objects falls within an allowable range with respect to a target weight.

* * * * *